No. 831,228. PATENTED SEPT. 18, 1906.
O. KAMPFE.
HANDLE.
APPLICATION FILED MAR. 7, 1905.

WITNESSES:
John A. Rennie
Henry R. Bauer

INVENTOR
Otto Kampfe
BY
Starr Crouse & Scherr
his ATTORNEYS

THE NORRIS PETERS CO., WASHINGTON, D. C.

UNITED STATES PATENT OFFICE.

OTTO KAMPFE, OF NEW YORK, N. Y.

HANDLE.

No. 831,228.         Specification of Letters Patent.         Patented Sept. 18, 1906.

Application filed March 7, 1905. Serial No. 248,906.

*To all whom it may concern:*

Be it known that I, OTTO KAMPFE, a citizen of the United States, and a resident of the borough of Brooklyn, county of Kings, city and State of New York, have invented certain new and useful Improvements in Handles, of which the following is a specification.

The object of my invention is to provide a metal handle for use, for example, on kitchen utensils, the construction of which is such that it radiates the heat so rapidly that it can at all times be grasped by the bare hand. I do not limit myself, however, to this use of my present invention, since, generally speaking, it is adapted to be used wherever a handle is required.

Other features of the handle are that it is adapted to take on a sightly appearance and may be cheaply constructed.

My present handle is adapted to be formed of a minimum of metal in the shape of metal strands or wires arranged in a cage-like form, so as to give a maximum circulation of air and to permit a maximum radiation of heat from the individual strands.

The drawings show some of the forms which my invention may take.

Figure 1:
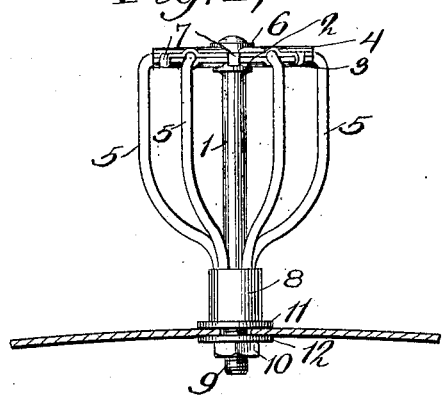
Figure 2:
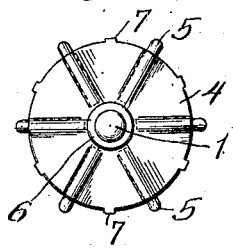
Figure 3:
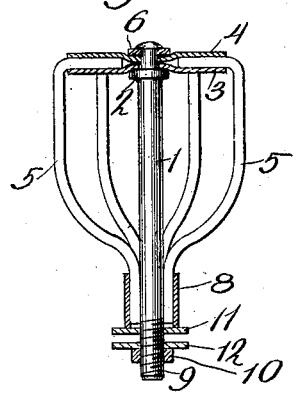
Figure 4:
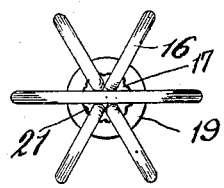
Figure 5:
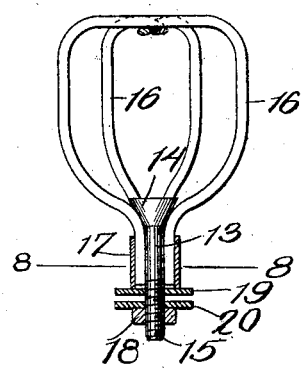
Figure 6:
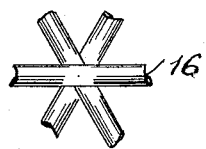
Figure 7:
Figure 8:
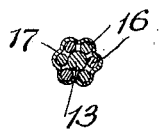

Figure 1 is a side elevation of one form of my improved handle, showing same attached to a portion of a lid. Fig. 2 is a top plan view of the handle shown in Fig. 1. Fig. 3 is a vertical mid-section of the handle shown in Fig. 1, showing some parts in elevation. Fig. 4 is a top plan view of another form of handle with my invention shown in Fig. 5. Fig. 5 is a vertical section, partly in elevation, of said last-mentioned form of handle. Figs. 6 and 7 together show a modification in the means of securing together the wires where they cross each other at the top of the handle shown in Fig. 5, Fig. 6 being a top plan view thereof and Fig. 7 a side view, partly in section and partly in elevation, of the parts shown in Fig. 6; and Fig. 8 is a cross-section along the line 8 8 on Fig. 5.

The handle shown in Figs. 1 to 3, inclusive, comprises a central rod 1, provided at its upper end with a collar 2. Two disks 3 and 4 are provided having central holes fitting over the end of the rod extending above the collar. The ends of the wires 5 are inserted between these disks in radial position and are clamped between them by riveting down the end of the rod, the washer 6 being preferably interposed, so that the actual riveting is against it instead of against the upper disk 4. The disks may be hammered, pressed, or otherwise shaped to conform with the outlines of the wires, so as to rigidly clamp said wires between them. (Compare Figs. 1 and 2.) For this purpose the disks should be made of some malleable material—for example, copper. Lugs 7 may be provided on the periphery of one of the disks intermediate the wires and may be bent around to embrace the other disk, the purpose being to give additional clamping power to the disks on the wires. The free ends of the wires are bent down and held against the lower portion of the rod by means of the sleeve 8. The portion 9 of the rod extending beyond said sleeve is screw-threaded and, together with the nut 10, comprises the attaching means for securing the handle to the given object. Thus in the case of a lid for a utensil the threaded portion will be passed through a hole in the lid and the nut applied from the other side. Washers 11 and 12 will preferably be provided on either side of the lid.

The other form of handle within my present invention and shown more specifically in Figs. 4 to 8, inclusive, comprises a rod 13, having a head 14 at one end thereof and screw-threads 15 at the other. Wires 16 are assembled about said rod with the two free ends of each wire in contact with the head end of the rod and parallel with the axis thereof. These wires form the knob of the handle. Preferably three wires will be used for this purpose. The free ends of the wires are secured to the rod in the position stated by means of a collar 17, which is forced over the ends of the wires, so as to press them firmly against the head 14 of the rod. The lower edge of the sleeve may act as a seat for the handle against the object—for example, the lid of a utensil—to which it is applied, the threaded end of the rod passing through a hole in the lid and being secured in place by the nut 18. Washers 19 and 20 may be provided as before. In this construction of Fig. 5, as well as in the construction of Figs. 1 and 3, it will be noted that when the handle is being attached to the given object and the nut on the threaded end of the rod is for this purpose tightened up the effect will be to draw the rod and the ends of the surrounding wires forcibly into the sleeve, which latter, however, is prevented from being drawn or moved in a similar manner by the utensil-lid or other object to which the handle is attached, acting as a seat or abutment to hold the sleeve stationary. In short, the resultant effect of either of these constructions is to force the sleeve farther up on the wires and to cause it to clamp them about the rod with increased force and security as the nut on the threaded end of the rod is tightened up to secure the handle to the given object. The sleeve 17 will preferably be indented intermediate the wires, so as to be of the corrugated form shown in Fig. 8, the purpose of this being to secure the wires in fixed relation to each other and to hold them more rigid against side motion where they cross one another. This same form of sleeve may of course be employed in the handle shown in Fig. 1. The wires 16 in the handle, Figs. 4 to 8, may be secured together where they cross at the top by forcibly squeezing said wires into each other by any suitable instrument, so that they take the form somewhat as shown in Figs. 6 and 7, Fig. 6 being a top plan view of the wires so united and Fig. 7 a cross-section indicating how the wires are merged into each other. In lieu of this way of uniting the wires the wires where they cross may be notched by bending, so as to accommodate each other at their point of crossing to give a sightly appearance and at the same time prevent as much as possible the individual wires from moving on each other.

Having thus described my invention, what I claim is—

1. In a handle, the combination of a rod; metal strands assembled about said rod in cage-like form; means for securing ends of said strands to the rod comprising a sleeve which surrounds said ends and clamps same together about the rod; and means adapted to act on the rod to attach the handle to the given object with the sleeve seated against said object.

2. In a handle, the combination of a rod; metal strands assembled about said rod in cage-like form; means for securing ends of said strands to the rod comprising a sleeve which surrounds said ends and clamps same together about the rod; and means for attaching the handle to the given object comprising screw-threads on the rod and a nut engaging said screw-threads.

3. In a handle, the combination of a rod, clamping-disks on said rod, metal strands clamped between said disks and radiating therefrom in cage-like form, and a sleeve which surrounds the free ends of said strands and clamps the same together about the rod.

4. In a handle, the combination of a rod, clamping-disks on said rod, metal strands clamped between said disks and radiating therefrom in cage-like form, a sleeve which surrounds the free ends of said strands and clamps the same together about the rod, and attaching means on the rod for securing the handle to the given object with the sleeve seated against said object.

5. In a handle, the combination of a rod; wires assembled about said rod in cage-like form; means for securing free ends of said wires about said rod comprising a sleeve having axial corrugations adapted to receive said wires and clamp same together about the rod; and means adapted to act on the rod to attach the handle to the given object with the sleeve seated against said object.

In witness whereof I have signed my name to the foregoing specification in the presence of two subscribing witnesses.

OTTO KAMPFE.

Witnesses:
E. W. SCHERR, Jr.,
JOHN G. HONEY.